(12) United States Patent
Hirano et al.

(10) Patent No.: US 7,257,126 B2
(45) Date of Patent: Aug. 14, 2007

(54) COMMUNICATION TERMINAL CONTAINING APPARATUS, COMMUNICATION TERMINAL APPARATUS, AND RADIO COMMUNICATION SYSTEM

(75) Inventors: Jun Hirano, Yokosuka (JP); Takashi Aramaki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 960 days.

(21) Appl. No.: 10/275,432

(22) PCT Filed: Mar. 6, 2002

(86) PCT No.: PCT/JP02/02068

§ 371 (c)(1),
(2), (4) Date: Feb. 4, 2003

(87) PCT Pub. No.: WO02/071696

PCT Pub. Date: Sep. 12, 2002

(65) Prior Publication Data

US 2003/0152054 A1 Aug. 14, 2003

(30) Foreign Application Priority Data

Mar. 6, 2001 (JP) ............................... 2001-62680
Mar. 30, 2001 (JP) ............................. 2001-101830

(51) Int. Cl.
*H04L 12/413* (2006.01)

(52) U.S. Cl. ..................... 370/447; 370/465

(58) Field of Classification Search ............. 370/230.1, 370/401, 411, 387, 395.1, 403, 392, 60, 60.1, 370/85.2, 95.3, 337, 338, 445, 447, 461, 370/462, 465
See application file for complete search history.

(56) References Cited

U.S. PATENT DOCUMENTS

| 5,012,469 A | * | 4/1991 | Sardana ...................... 370/322 |
| 5,570,355 A | * | 10/1996 | Dail et al. .................. 370/352 |
| RE38,134 E | * | 6/2003 | Ross et al. .................... 710/20 |

(Continued)

FOREIGN PATENT DOCUMENTS

JP    1 1112412    4/1999

(Continued)

OTHER PUBLICATIONS

International Search Report dated Jun. 18, 2002.

*Primary Examiner*—Chau Nguyen
*Assistant Examiner*—Kenneth R. Hartmann
(74) *Attorney, Agent, or Firm*—Stevens, Davis, Miller & Mosher, LLP

(57) ABSTRACT

The present invention discloses a communication terminal accommodation device that makes communication terminals under the control of different wireless LAN systems communicate with each other. In a first system, the transmission and reception periods of a downlink signal, a direct-link signal, and an uplink signal are set after the transmission and reception periods of RCH, BCH, FCH and ACH control channels. In a second system, the transmission and reception period of a PCF mode is set immediately after a beacon, and the transmission and reception period of a DCF mode is set after that. In the first system, a period after the PCF mode of the second system is set as an unused period, and the RCH reception period is set to start at the start time of the PCF mode of the second system.

8 Claims, 11 Drawing Sheets

U.S. PATENT DOCUMENTS 6,990,116 B1 * 1/2006 Young et al. ............... 370/445

FOREIGN PATENT DOCUMENTS

| JP | 3004243 | 11/1999 |
| JP | 2000 165352 | 6/2000 |
| JP | 2001 217841 | 8/2001 |
| JP | 2001 274805 | 10/2001 |

* cited by examiner

COMMUNICATION TERMINAL CONTAINING APPARATUS, COMMUNICATION TERMINAL APPARATUS, AND RADIO COMMUNICATION SYSTEM

TECHNICAL FIELD

The present invention relates to a communication terminal accommodation device in a wire communication system or mobile communication system and, in particular, to a communication terminal accommodation device enabling communication between communication terminals in different systems, a communication terminal, and a wireless communication system including the communication terminal accommodation device and the communication terminal.

BACKGROUND ART

Recently, high-speed, mass transmission has been desired in various user environments such as the public, office, and home environments, and wireless LAN (Local Area Network) technology has received much attention as such data transmission technology. Standardization activities of wireless LANs are being promoted such as high-performance LAN (High Performance Local Area Network) or IEEE802.11 systems.

The high-performance wireless LANs are a master-slave type network in which a communication terminal accommodation device performs centralized control so that a plurality of communication terminals will communicate with the communication terminal accommodation device. Specifically, as shown in FIG. 19, an access point (AP) 1901 as the communication terminal accommodation device performs centralized control relating to communication with mobile terminals (MTs) 1902 and 1903. When the MTs 1902 and 1903 communicate with each other, the communication is always carried out through the AP 1901.

The IEEE802.11 systems are a direct connection network, and are defined as a centralized control type (Point Coordination Function: PCF) and a distributed control type (Distributed Coordination Function: DCF). As shown in FIG. 20A, the centralized control type is such that a point coordinator (PC) 2001 with control capabilities performs centralized control relating to communication with stations (STAs) 2002 and 2003. Therefore, when the STAs 2002 and 2003 communicate with each other, the communication is always carried out through the PC 2001.

On the other hand, the distributed control type is such that, as shown in FIG. 20B, each of STAs 2004 to 2006 performs carrier sense before data transmission so that it initiates communication after making certain a transmission medium is vacant.

Thus the high-performance LANs and IEEE80802.11 are standardized as separate wireless LAN systems.

As matters now stand, however, even wireless LANs cannot enable communication between communication terminals in different systems. In other words, MT under the control of AP and STA under the control of PC cannot communicate with each other.

DISCLOSURE OF THE INVENTION

The present invention has been made in view of the above-mentioned points, and it is an object thereof to provide a communication terminal accommodation device enabling communication between communication terminals under the control of different wireless LAN systems without interference with each other, and a communication terminal device, and a wireless communication system including the communication terminal accommodation device and the communication terminal device.

The present invention provides a communication terminal accommodation device which includes: first communication control means for performing communication in a master-slave network; second communication control means for performing communication in a direct connection network; and identification signal inserting means for inserting an identification signal into a transmission signal to monitor each control mode period.

According to this structure, each control mode period is controlled to integrate the master-slave network and the direct connection network and enable communication between terminals under the control of both systems.

In the above communication terminal accommodation device of the present invention, the identification signal inserting means inserts the identification signal at the timing just after the transmission of an annunciation channel in the master-slave network.

According to this structure, communication terminals in the master-slave network can receive the identification signal information at the fixed timing that comes just after the transmission of the annunciation channel the cycle of which is known. This makes it possible to simplify the complexity of the terminal devices compared to such a case that the identification signal is transmitted after a channel following the annunciation channel and varying in timing.

In the above communication terminal accommodation device of the present invention, the identification signal inserting means inserts the identification signal at the timing just after a broadcast phase containing the annunciation channel in the master-slave network.

According to this structure, communication terminals in the master-slave network can receive the identification signal information at the timing just after the annunciation channel with a known cycle and the broadcast phase the period of which is designated in the annunciation channel. Further, since conventionally used communication terminals never receive data just after the broadcast phase, the conventionally used communication terminals and communication terminals according to the present invention can be mixedly used.

In the above communication terminal accommodation device of the present invention, the identification signal is commonly used to identify both centralized control and distributed control modes in the direct connection network.

According to this structure, the transmission period of the identification signal can be shortened, thereby improving transmission efficiency.

In the above communication terminal accommodation device of the present invention, the identification signal inserting means varies the length of the period of the centralized control mode to be protected by the identification signal.

According to this structure, the setting of a period to be protected can be changed accordingly.

In the above communication terminal accommodation device of the present invention, an upper limit to the period of the distributed control mode is provided within a range not exceeding the length of a transmission unit for communication in the direct connection network.

According to this structure, data on each control mode period is handled within the range of the frame period of the master-slave network to make the wireless LAN system available therefore, thus utilizing the wireless LAN system efficiently.

In the above communication terminal accommodation device of the present invention, the identification signal inserting means inserts an identification signal including information on the presence or absence of a frame in the master-slave network or its frame period if any.

According to this structure, frame duration and interval in the master-slave network can be posted to the terminals.

In the above communication terminal accommodation device of the present invention, the identification signal inserting means inserts the identification signal just after completion of the period of the distributed control mode.

According to this structure, communication terminals in the master-slave network, which have a function of confirming the identification signal, can ensure a connection request period efficiently.

In the above communication terminal accommodation device of the present invention, communication in the centralized control mode is initiated immediately following the identification signal just after completion of the period of the distributed control mode, and the transmission of a frame of the master-slave network is initiated at the frame timing in the master-slave network.

According to this structure, communication in the master-slave network can be performed during a protected period, and the transmission of a frame can be initiated each time the frame timing comes around in the master-slave network to perform frame transmission plural times.

Even when communication in the centralized control mode is allocated between frames in the master-slave network, frame transmission of the master-slave network can be performed again when the next frame timing comes around.

In the above communication terminal accommodation device of the present invention, the communication period of a variable-length packet in the master-slave network is provided immediately following the identification signal just after completion of the period of the distributed control mode so that frame transmission of the master-slave network will be initiated at the frame timing in the master-slave network.

According to this structure, communication in the master-slave network can be performed during a protected period, and the transmission of a frame can be initiated periodically, that is, periodic data transmission of an annunciation channel can be secured. In particular, the provision of an upper limit to the period of the distributed control mode can secure this periodicity.

In the above communication terminal accommodation device of the present invention, priority is given to a connection request in a connection request period immediately following the identification signal just after completion of the period of the distributed control mode.

According to this structure, a communication resource request in the additional connection request period following the identification signal can be handled on a priority basis. This makes it possible to give the terminals communication resources more effectively compared to normal communication terminals.

The above communication terminal accommodation device of the present invention further includes monitoring means for monitoring traffic conditions in the communication, and communication period calculating means for calculating communication periods in the master-slave network and the direct connection network based on the traffic conditions.

According to this structure, the communication periods in the master-slave network and the direct connection network can be changed dynamically according to the traffic conditions.

In the above communication terminal accommodation device of the present invention, the communication period calculating means further includes first required-band calculating means for calculating a required band from a communication request in the master-slave network monitored by the monitoring means, second required-band calculating means for calculating a required band from a communication request in the centralized control mode of the direct connection network monitored by the monitoring means, and third required-band calculating means for calculating a required band from a usage or collision rate in the distributed control mode of the direct connection network monitored by the monitoring means, in which the communication periods are calculated, based on the required bands calculated from the first to third required-band calculating means, so that communication in the master-slave network and communication in the direct connection network will be distributed impartially.

According to this structure, even when communication has become tight in either system, since communication resources are distributed impartially throughout the entire system, stable system operation as a whole becomes possible.

In the above communication terminal accommodation device of the present invention, the communication period calculating means calculates the communication period of a variable-length packet in the master-slave network immediately following the identification signal just after completion of the period of the distributed control mode, and calculates a mixed period based on the communication period, such that the transmission of a frame of the master-slave network is performed during the communication period at the frame timing in the master-slave network, while communication is performed during the mixed period in such a communication state that it is mixed with communication in the distributed control mode.

According to this structure, the master-slave network and the distributed control mode of the direct connection network are operated on such a form that they are partially mixed, which makes it possible to operate them on a basis of equitable probability of communication collision and success. Therefore, the communication period calculation means can reduce the amount of operation, thereby reducing the size of the device and increasing the processing speed.

The present invention also provides a communication terminal device which includes: identification signal confirmation means for confirming an identification signal that protects the period of a centralized control mode in a direct connection network; and communication control means for initiating communication in the centralized control mode of the direct connection network after the identification signal has been confirmed.

According to this structure, since the identification signal that protects the period of the centralized control mode matching with the communication period of a master-slave network can be confirmed, it can be recognized in which period and mode communication should be performed.

The present invention further provides a communication terminal device which is configured to confirm an identification signal inserted at the timing just after the transmission of an annunciation channel in the master-slave network, or an identification signal inserted at the timing just after a broadcast phase including the annunciation channel in the master-slave network.

According to this structure, the identification signal can be confirmed at the fixed timing just after the transmission of the annunciation channel or at the timing just after the broadcast phase the period of which is designated in the annunciation channel. In other words, the communication terminal device has only to receive the identification signal according to the frame timing without the need to search for the identification signal throughout the entire frame period, thereby simplifying the communication terminal device.

The present invention further provides a communication terminal device which includes: identification signal confirmation means for confirming an identification signal that protects the centralized control mode of the direct connection network; and connection request means for making a connection request during a connection request period provided after the identification signal has been confirmed.

According to this structure, since the identification signal can be confirmed, the connection request can be made in the connection request period to which priority is given, which makes it possible for the communication terminal device to make a connection request to a communication terminal accommodation device more advantageously than normal communication terminals.

In the above communication terminal device of the present invention, a connection request to which a higher priority is given is made in the connection request period immediately following the identification signal.

According to this structure, when the communication terminal device needs to request communication resources on a priority basis, it can make a connection request in the additional connection request period following the identification signal. It allows the communication terminal device to make a connection request more advantageously than normal communication terminals.

The above communication terminal device of the present invention further includes information confirmation means for confirming information contained in the identification signal, which indicates the presence or absence of a frame in the master-slave network or it period if any, such that periods for systems other than the system to which the terminal device itself belongs are changed to a standby state on the basis of the information confirmed by the information confirmation means.

According to this structure, each terminal can know frame duration and interval in the master-slave network, or frame duration and interval in the direct connection network. Since it is clear that communication is not performed during system periods other than that for the system concerned, the communication terminal can halt its transmission and reception functions mainly to realize power savings.

The above communication accommodation device of the present invention further includes information confirmation means for confirming information contained in the identification signal, which indicates the presence or absence of a frame in the master-slave network or its period if any, such that communication is switched as being adapted to each system based on the information confirmed by the information confirmation means.

According to this structure, each terminal can know frame duration and interval in the master-slave network, or frame duration and interval in the direct connection network. Further, the communication terminal can switch itself between the master-slave type and the direct connection type to perform communication to suit the period during which each system is operated. It allows the communication terminal to automatically utilize the periods for plural systems to perform communication according to the system switchover in the communication terminal accommodation device, and hence ensure large communication capacities.

The present invention further provides a wireless communication system which includes: a communication terminal accommodation device including first communication control means for performing communication in a master-slave network, second communication means for performing communication in a direct connection network, and identification signal inserting means for inserting an identification signal into a transmission signal to monitor each control mode period; and a communication terminal device for the direct connection network including identification signal confirmation means for confirming an identification signal that protects the period of a centralized control mode in the direct connection network, and communication control means for initiating communication in the centralized control mode of the direct connection network after the identification signal has been confirmed.

According to this structure, communication in the master-slave network, and communication in the distributed control mode and the centralized control mode of the direct connection network can be realized even with the same space and frequency, which makes them possible to use conventional communication terminals and perform communication between different systems.

The present invention further provides a wireless communication system which includes: a communication terminal accommodation device including first communication control means for performing communication in a master-slave network, second communication means for performing communication in a direct connection network, and identification signal inserting means for inserting an identification signal into a transmission signal to monitor each control mode period; and a communication terminal device for the master-slave network, which is configured to confirm an identification signal inserted at the timing just after the transmission of an annunciation channel in the master-slave network, or an identification signal inserted at the timing just after a broadcast phase including the annunciation channel in the master-slave network.

According to this structure, communications in the master-slave network, and communication in the distributed control mode and the centralized control mode of the direct connection network can be realized even with the same space and frequency, which makes them possible to use conventional communication terminals and perform communication between different systems.

The present invention further provides a wireless communication system which includes: a communication terminal accommodation device including first communication control means for performing communication in a master-slave network, second communication means for performing communication in a direct connection network, and identification signal inserting means for inserting an identification signal into a transmission signal to monitor each control mode period; and a communication terminal device for the master-slave network including identification signal confirmation means for confirming an identification signal that protects the period of a centralized control mode in the direct connection network, and connection request means for making a connection request during a connection request period provided after the identification signal has been confirmed.

According to this structure, communication in the master-slave network, and communication in the distributed control mode and the centralized control mode of the direct connection network can be realized even with the same space and frequency, which makes them possible to use conventional communication terminals and perform communication between different systems.

In the wireless communication systems of the present invention, when the communication terminal device in the direct connection network is not participating in communication, the system is operated as a conventional master-slave network, and at the time when the communication terminal device in the direct connection network initiates communication, management of two or more communication systems is started using the identification signal.

According to this structure, communication resources for the direct connection network do not need allocating for periods during which no communication terminal device in the direct connection network is being involved in the communication, which makes possible effective use of communication resources.

In the wireless communication systems of the present invention, when the communication terminal device in the direct connection network stops participating in the communication while the management of two or more communication systems is being performed, the system is operated as a conventional master-slave network.

According to this structure, communication resources for the direct connection network do not need allocating for periods during which no communication terminal device in the direct connection network is being involved in the communication, which makes possible effective use of communication resources.

BEST MODES FOR CARRYING OUT THE INVENTION

High-performance wireless LAN systems of the master-slave network type use fixed-length packets and form the concept of periodic frames. IEEE802.11 systems of the direct connection network type use variable-length packets without the concept of frames. The IEEE802.11 systems, however, include centralized control mode and distributed control mode, and the period of the centralized control mode is fixed.

The inventors have made this invention by focusing attention on the fixed-length part in the high-performance wireless LAN system and the fixed part of the centralized control mode of the IEEE802.11 system. In other words, the inventors have found that communication between communication terminals under the control of both systems can be realized by matching the period of the centralized control mode with the fixed-length part of the high-performance wireless LAN system to manage the period of the centralized control mode so that the IEEE802.11 system using variable-length packets will be integrated without leaving out the concept of fixed-length packets in the high-performance wireless LAN system.

The gist of the present invention is to insert into a transmission signal an identification signal, which can be identified by at least communication terminals under the control of the IEEE802.11 system, to enable communication between communication terminals in the high-performance wireless LAN system and the IEEE802.11 system.

Embodiments of the present invention will be described in detail below with reference to the accompanying drawings.

FIRST EMBODIMENT

Figure 1:
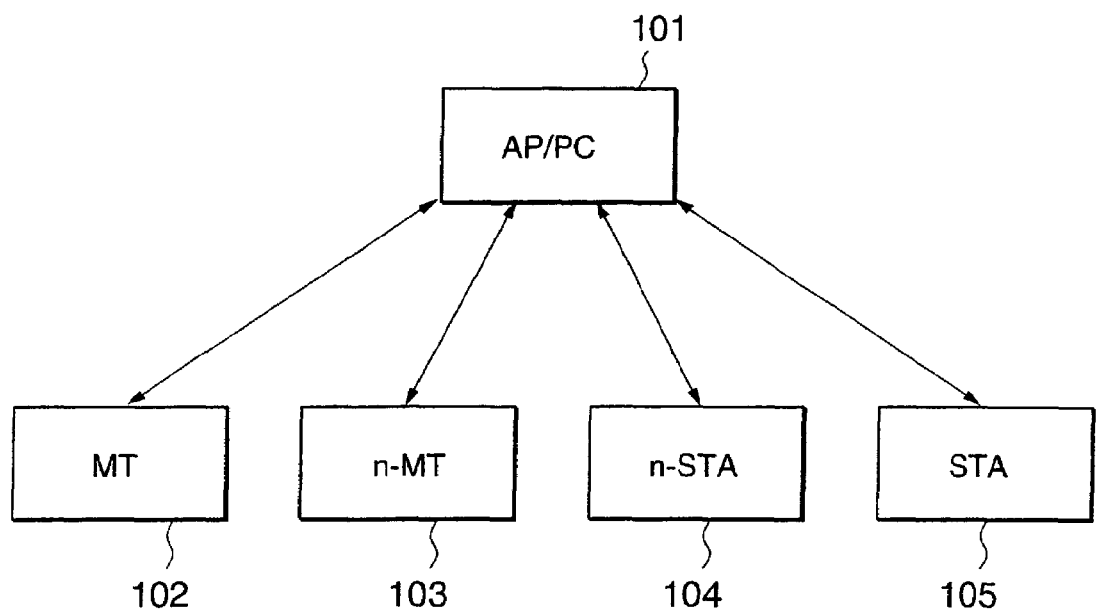
FIG. 1 is a diagram showing a configuration of a wireless LAN system provided with a communication terminal accommodation device according to the first embodiment of the present invention.

FIG. 1 is a diagram showing a configuration of a wireless LAN system provided with a communication terminal accommodation device according to the first embodiment of the present invention. In the wireless LAN system shown in FIG. 1, an AP/PC 10 as the communication terminal accommodation device of the present invention has both functions as a high-performance wireless LAN (master-slave network)

AP and a PC in the IEEE802.11 system (direct connection network). The wireless LAN system is such that a normal high-performance LAN MT 102, n-MT 103 and n-STA 104 that support the wireless LAN system according to the present invention, and a normal STA 105 in the IEEE802.11 system communicate with one another. In this case, communication is made possible between MT (n-MT) and STA (n-STA) in addition to between MTs (n-MTs) and STAs (n-STAs).

Figure 2:
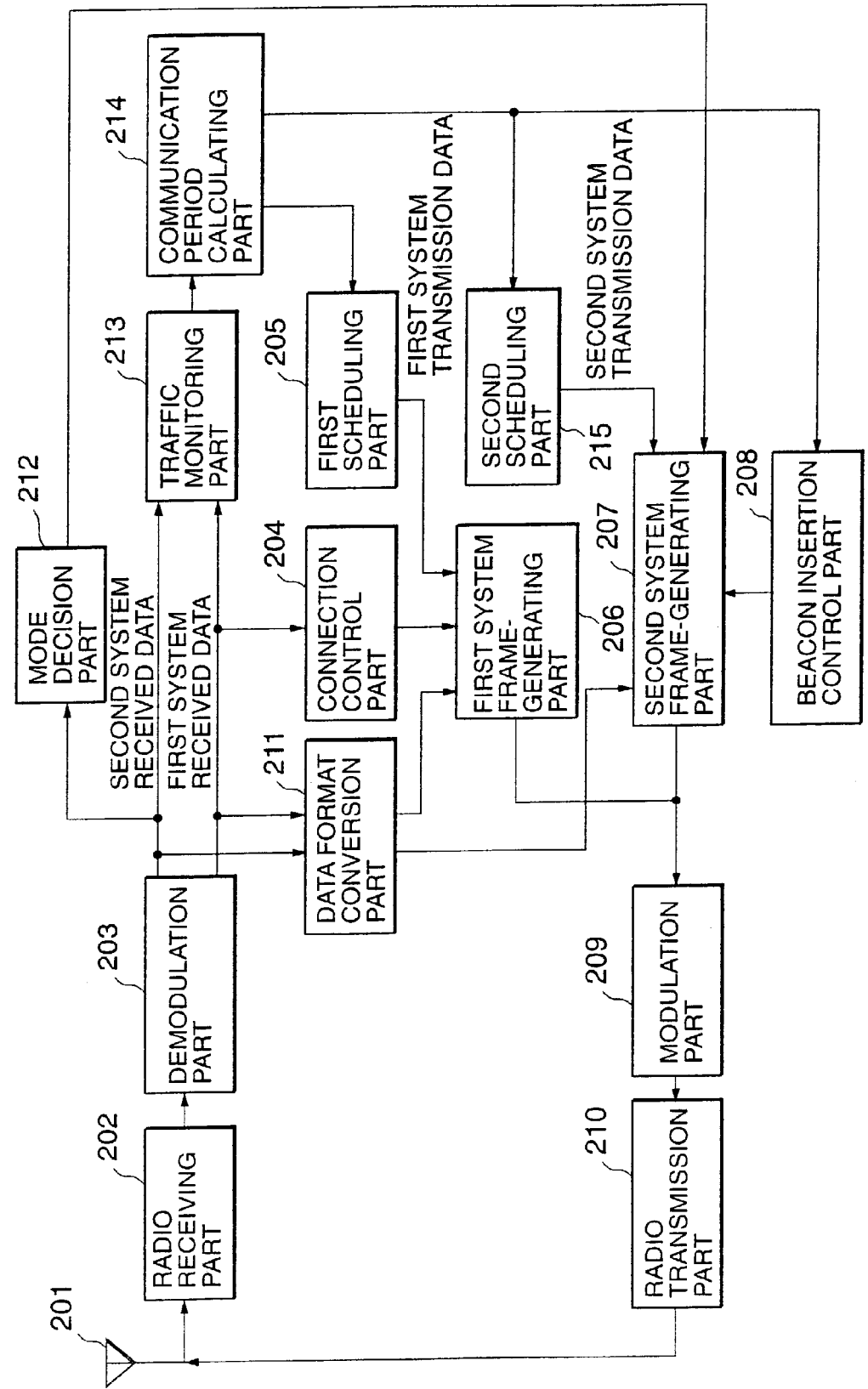
FIG. 2 is a block diagram showing a configuration of the communication terminal accommodation device according to the first embodiment of the present invention.

FIG. 2 is a block diagram showing a configuration of the communication terminal accommodation device according to the first embodiment of the present invention. In this embodiment, it is assumed that the high-performance wireless LAN system is a first system, and the IEEE802.11 system is a second system.

In the first system, transmission data is contained in a packet, and a periodic frame is created from the packet. In the second system, transmission data from each terminal is configured as a variable-length frame. In other words, in the first system, transmission data on the AP/PC side is arranged in a frame as a packet together with the periodic frame, while transmission data on the MT side is transmitted as a packet according to the periodic frame created by the AP/PC. In the second system, both the AP/PC side and the STA side form variable-length frames.

An uplink signal transmitted from the MT (n-MT) or STA (n-STA) is received at a radio receiving part 202 through an antenna 201. The radio receiving part 202 performs predetermined radio receiving processing for the uplink signal (such as down-conversion or A/D conversion) and outputs the signal after subjected to the radio receiving processing to a demodulation part 203.

The demodulation part 203 performs demodulation of the signal after subjected to the radio receiving processing and outputs received data as appropriate to both the first and second systems. In other words, when the uplink signal is from the MT (n-MT), the demodulation part 203 outputs received data for the first system, while when the uplink signal is from the STA (n-STA), it outputs received data for the second system.

The received data for the first system is outputted from the demodulation part 203 to a connection control part 204, a traffic monitoring part 213, and a data format conversion part 211. On the other hand, the received data for the second system is outputted from the demodulation part 203 to the data format conversion part 211 and the traffic monitoring part 213. The received signal for the second system is also outputted from the demodulation part 203 to a mode decision part 212.

The connection control part 204 controls call connection based on a signal appearing in an RCH (Random Access Channel) period as the received data for the first system. The traffic monitoring part 213 monitors the traffic and outputs traffic information to a communication period calculating part 214. The communication period calculating part 214 calculates the communication period of the first system, the PCF mode period of the second system, and the DCF mode period of the second system, based on the traffic information. The communication period of the first system is outputted to a first scheduling part 205, while the PCF mode period of the second system and the DCF mode period of the second system are outputted to a second scheduling part 215.

The first scheduling part 205 performs scheduling for transmitting transmission data for the first system based on the information on the communication period of the first system, and outputs the scheduling results to a first system frame-generating part 206.

The second scheduling part 215 performs scheduling for transmitting transmission data for the second system based on the information on the PCF mode period of the second system and the DCF mode period of the second system, and outputs the scheduling results to a second system frame-generating part 207.

When an uplink signal from the MT (n-MT) is transmitted as a downlink signal to the STA (n-STA), or when an uplink signal from the STA (n-STA) is transmitted as a downlink signal to the MT (n-MT), the data format conversion part 211 performs conversion into a data format appropriate between the first system and the second system.

The mode decision part 212 makes a decision as to whether the received data for the second system should be transmitted in the PCF mode or DCF mode. Mode information obtained by this mode decision is outputted to the second system frame-generating part 207.

The output of the connection control part 204 and the output of the first scheduling part 205 are delivered to the fist system frame-generating part 206. The output of the data format conversion part 211 is delivered to the first system frame-generating part 206 or the second system frame-generating part 207 depending upon the destination system.

The first system frame-generating part 206 generates a frame using scheduled transmission data for the first system or transmission data for the first system the data format of which has been converted, and outputs the transmission frame to a modulation part 209.

The PCF and DCF mode periods of the second system calculated by the communication period calculating part 214 are outputted to a beacon insertion control part 208. The beacon insertion control part 208 considers the PCF and DCF mode periods of the second system to decide the position in which a beacon should be inserted, and outputs the position information to the second system frame-generating part 207.

The second system frame-generating part 207 generates a frame using transmission data for the second system or transmission data for the second system the data format of which has been converted, according to the mode information outputted from the mode decision part 212 and the scheduling results from the second scheduling part 215. At this time, a beacon is also inserted. The transmission frame and the beacon are outputted to the modulation part 209.

The modulation part 209 performs modulation of the transmission frame and the transmission packet and outputs a modulated signal to a radio transmitting part 210. The radio transmitting part 210 performs predetermined radio transmitting processing for the modulated signal (such as D/A conversion or up-conversion) and transmits the signal after subjected to the radio transmitting processing as a downlink signal to the MT (n-MT) or STA (n-STA) through the antenna 201.

The above-mentioned flow of data is to transmit the data received from a communication terminal through an uplink. On the other hand, when data transmitted from the network side to the AP/PC is transmitted to a communication terminal through a downlink, or when data transmitted from a communication terminal through an uplink is transmitted to the network side, the flow of data is the same as normal one.

Figure 3:
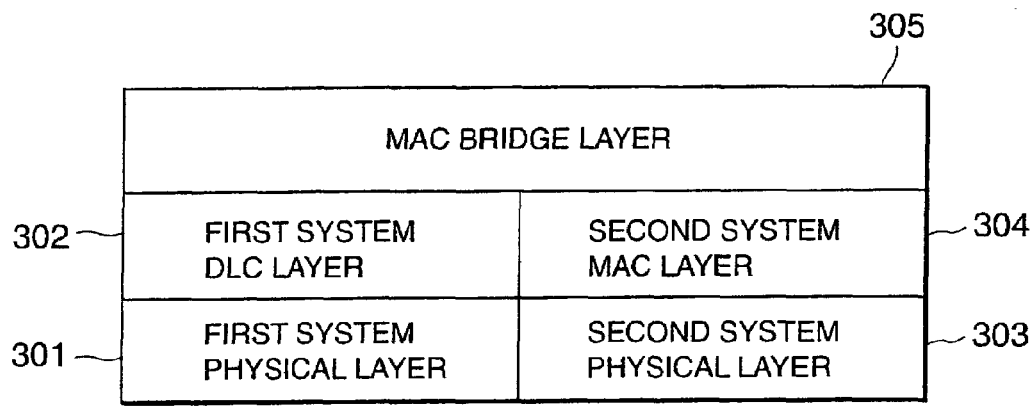
FIG. 3 is a diagram showing the layer structure of the communication terminal accommodation device according to the first embodiment of the present invention.

FIG. 3 is a diagram showing the layer structure of the communication terminal accommodation device according to the first embodiment of the present invention. In the wireless LAN system according to the present invention, a fist system DLC (Data Link Control) layer 302 is located above a physical layer 301 of the first system as the high-performance wireless LAN system, and a second system MAC (Medium Access Control) layer 304 is located above a physical layer 303 of the second system as the IEEE802.11 system. Then, a MAC bridge layer 305 having a bridge function between both systems is located above the first system DLC layer 302 and the second system MAC layer 304. The layer structure, however, is not limited to that in FIG. 3, and various changes in the arrangement of the physical layers, the first system DLC layer and the second system MAC layer are possible as long as the MAC bridge layer is arranged as the upper layer of both systems.

Figure 4:
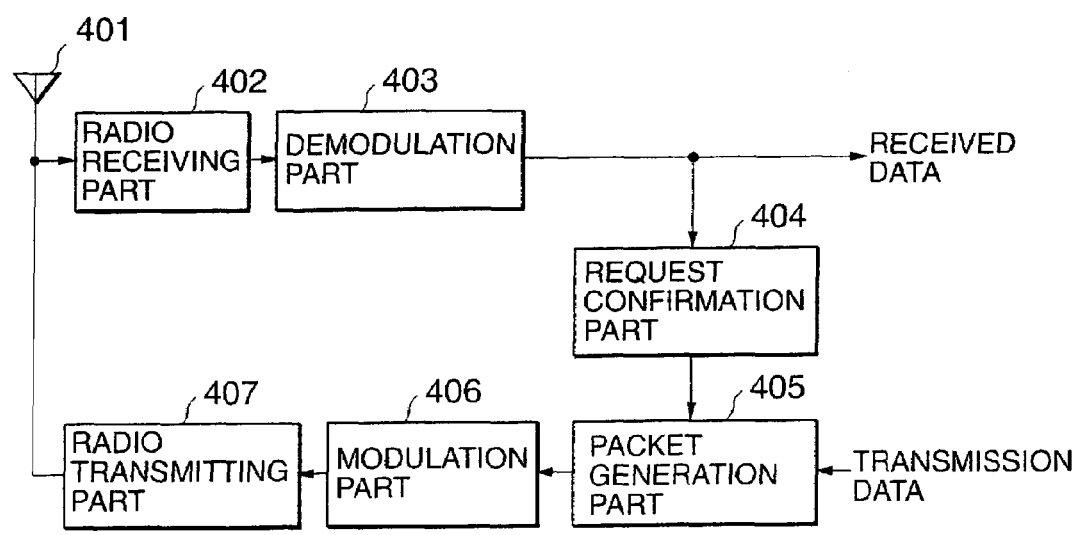
FIG. 4 is a diagram showing a configuration of a communication terminal MT in a first system used in the wireless LAN system shown in FIG. 1.

FIG. 4 is a diagram showing a configuration of a communication terminal MT in the first system used in the wireless LAN system shown in FIG. 1.

A downlink signal transmitted from the AP/PC 101 is received at a radio receiving part 402 through an antenna 401. The radio receiving part 402 performs predetermined radio receiving processing for the downlink signal (such as down-conversion or A/D conversion) and outputs the signal after subjected to the radio receiving processing to a demodulation part 403.

The demodulation part 403 performs demodulation of the signal after subjected to the radio receiving processing and outputs received data. The received data from the demodulation part 403 is outputted to a request confirmation part 404.

The request confirmation part 404 outputs to a packet generation part 405 an instruction signal to instruct the AP/PC to send a transmission request, based on information on the result to the call connection request transmitted through an ACH (Acquisition Indication Channel). The request confirmation part 404 also outputs to the packet generation part 405 schedule information transmitted through an FCH (Forward Access Channel).

The packet generation part 405 not only inserts the transmission request based on the result to the call connection request to generate a transmission packet, but also uses transmission data to generate a transmission packet according to the schedule information. The packet generation part 405 outputs the transmission packet to a modulation part 406.

The modulation part 406 performs modulation of the transmission packet and outputs a modulated signal to a radio transmitting part 407. The radio transmitting part 407 performs predetermined radio transmitting processing for the modulated signal (such as D/A conversion or up-conversion) and transmits the signal after subjected to the radio transmitting processing as an uplink signal to the AP/PC through the antenna 401.

Figure 5:
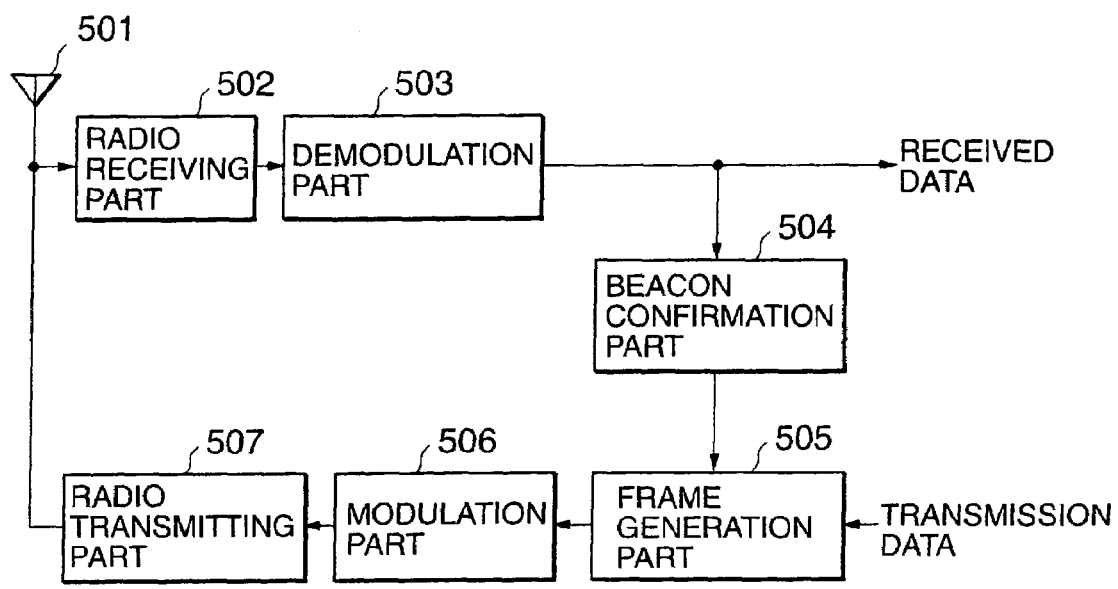
FIG. 5 is a diagram showing a configuration of a communication terminal n-STA in a second system used in the wireless LAN system shown in FIG. 1.

FIG. 5 is a diagram showing a communication terminal n-STA in the second system used in the wireless LAN system shown in FIG. 1.

A downlink signal transmitted from the AP/PC 101 is received at a radio receiving part 502 through an antenna 501. The radio receiving part 502 performs predetermined radio receiving processing for the downlink signal (such as down-conversion or A/D conversion) and outputs the signal after subjected to the radio receiving processing to a demodulation part 503.

The demodulation part 503 performs demodulation of the signal after subjected to the radio receiving processing and outputs received data. The received data from the demodulation part 503 is outputted to a beacon confirmation part 504.

The beacon confirmation part 504 confirms a beacon included in the signal transmitted by the AP/PC. It can thus be recognized that the PCF mode is started after the beacon. After confirming the beacon, the beacon confirmation part 504 outputs a confirmation signal to a frame generation part 505.

The frame generation part 505 uses transmission data to generate a transmission frame based on the PCF and DCF modes according to the confirmation signal. Then the frame generation part 505 outputs the transmission frame to a modulation part 506.

The modulation part 506 performs modulation of the transmission frame and outputs a modulated signal to a radio transmitting part 507. The radio transmitting part 507 performs predetermined radio transmitting processing for the modulated signal (such as D/A conversion or up-conversion) and transmits the signal after subjected to the radio transmitting processing as an uplink signal to the AP/PC through the antenna 501.

The identification signal such as the beacon will now be described. In the second system, a function of inserting an identification signal into a transmission signal has been conventionally defined for identifying the PCF mode and the DCF mode. On the other hand, in the wireless LAN system according to the present invention, the first system and the second system coexist with some time difference between them, and use an identification signal such as the beacon to enable mutual communication. Thus, the wireless LAN system according to the present invention uses two kinds of identification signals such as the beacon.

The identification signal such as the beacon to enable communication between the first and second systems can be used commonly as the identification signal such as the beacon to identify the PCF mode and the DCF mode to shorten the transmission period of the identification signal, thereby improving transmission efficiency.

The identification signal such as the beacon is to set the period of the PCF mode in the IEEE802.11 system, that is, indicate the start of the PCF mode and the length or duration of the PCF mode. Various changes in this protected period (length) are possible.

The period to be protected in the PCF mode may be changed dynamically. For example, the period can be changed accordingly to achieve a fair sharing of communication periods between the first and second systems.

In this case, since the first system and the PCF mode of the second system have respectively fixed periods, traffic conditions in the DCF mode are monitored to calculate the period of the first system, the period of the PCF mode of the second system and, based on the monitoring results, a period desired for communication in the PCF mode. The term "PCF mode" means that the mode itself includes collision prevention and protection functions.

Specifically, the traffic monitoring part 213 shown in FIG. 2 monitors traffic conditions to determine the communication period of the first system, the PCF mode period of the second system, and the DCF mode period of the second system according to the monitoring results (traffic conditions). Both systems communicate each other according to the communication periods. This makes it possible to dynamically change the period for communication in the first system and the period for communication in the second system according to the traffic conditions.

Figure 6:
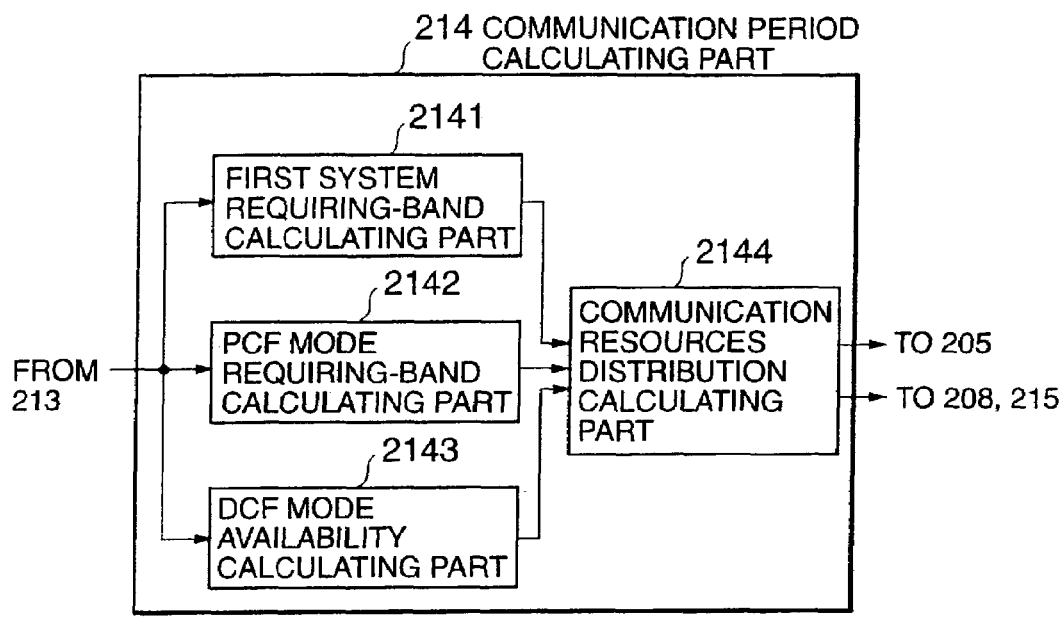
FIG. 6 is a block diagram showing a configuration of a communication period calculating part of the communication terminal accommodation device shown in FIG. 2.

For example, the communication period calculating part 214 is configured as shown in FIG. 6. The communication period calculating part 214 includes the following parts, all of which perform calculations based on information from the traffic monitoring part 213: a first system requiring-band calculating part 2141 for calculating a band required in the first system, a PCF mode requiring-band calculating part 2142 for calculating a band required in the PCF mode of the second system, and a DCF mode availability calculating part 2143 for calculating the availability or utilization factor of the DCF mode of the second system. The communication period calculating part 214 also includes a communication resources distribution calculating part 2144 for distributing communication resources based on the calculation results from the above calculation parts 2141 to 2143.

For example, the entire band distribution is decided from the calculation results on the first system requiring band, the PCF mode requiring band, and the DCF mode requiring band (availability). For example, the distribution ratio is 9:3:7. The distribution ratio may be set as fixed to achieve a more equal distribution of communication resources, or variable according to the usage patterns. Further, the distribution ratio may vary with time according to requests from communication terminals.

In this case, even when communication has become tight in any system, since communication resources are distributed impartially throughout the entire system, stable system operation as a whole is possible.

Figure 7:
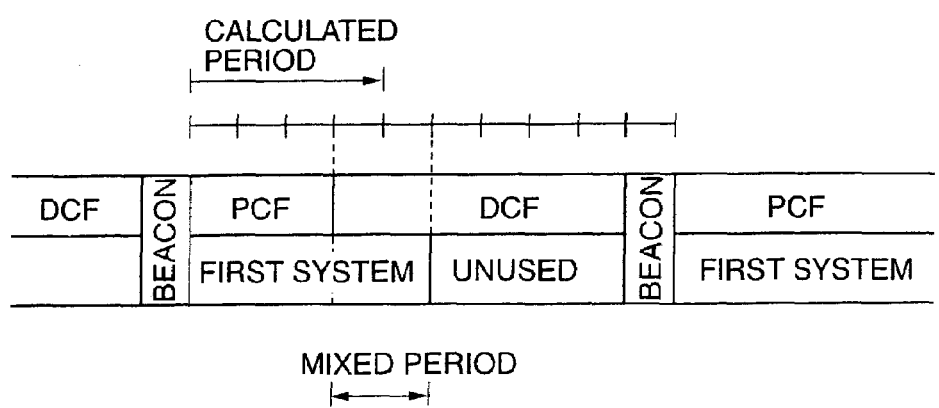
FIG. 7 is a diagram showing the first example of a format used in the wireless LAN system shown in FIG. 1.

Further, as shown in FIG. 7, the communication period calculating part 214 may calculate the period to be protected in the PCF mode to form the entire system based on the calculated period so that the frame in the first system and the DCF mode in the second system will coexist. It should be noted that, in the formats shown in FIGS. 7 to 10, 12 to 15, and 18, the upper row represents the second system as the IEEE802.11 system and the lower row represents the first system as the high-performance wireless LAN system.

At this time, the communication period calculating part 214 performs approximate calculations, for example, in the order of 10 percent of the frame cycle, rather than precise calculations of the periods, to maintain the fairness of communication resources used in the first system and communication resources used in the DCF mode of the second system. In this case, since the length of the mixed period is plus or minus 10 percent, collisions of packets stochastically take place in the mixed period, and the fairness is roughly maintained. This makes them possible to reduce calculation time relating to communication period calculations and simplify the calculation device. In FIG. 7, although a predetermined mixed period is arranged before and after the end point of the period calculated by the communication period calculating part 214, the mixed period can start from the beginning of the calculated period or can be arranged after a predetermined elapsed time length from the end point of the calculated period. In other words, various forms of arrangement of the mixed period are possible based on the calculated period.

Accordingly, the entire system is operated in such a form that the first system and the DCF mode of the second system are partially mixed, with maintaining stochastic fairness in the communication collision or success rate. This makes them possible to reduce the amount of calculations made by the communication period calculating part 214, reduce the device size, and increase the processing speed.

Further, the proportion of allocation of communication periods for both systems may be set appropriately on the AP/PC side so that, when any system side makes a request to modify the proportion of the communication periods, a period desired for protection of the PCF mode will be calculated.

On the other hand, in the DCF mode, data with a data length longer than the DCF mode period may be transmitted. In such a case, since the data cannot be processed in the wireless LAN system, an upper limit to the data length to be handled in the DCF mode period may be provided beforehand within a range not exceeding the length of the transmission unit (2 ms here) in the wireless LAN system so that only the data capable of being handled in the DCF mode period will be transmitted. The upper limit can be set in the second system MAC layer.

The wireless LAN system is thus made available for the data capable of being handled in the DCF mode period, and efficient utilization of the wireless LAN system becomes possible. In this case, a mode for providing the upper limit to the data length handled in the DCF mode period and a mode for not providing the upper limit may be set so that switchover between both modes will be made.

Figure 8:
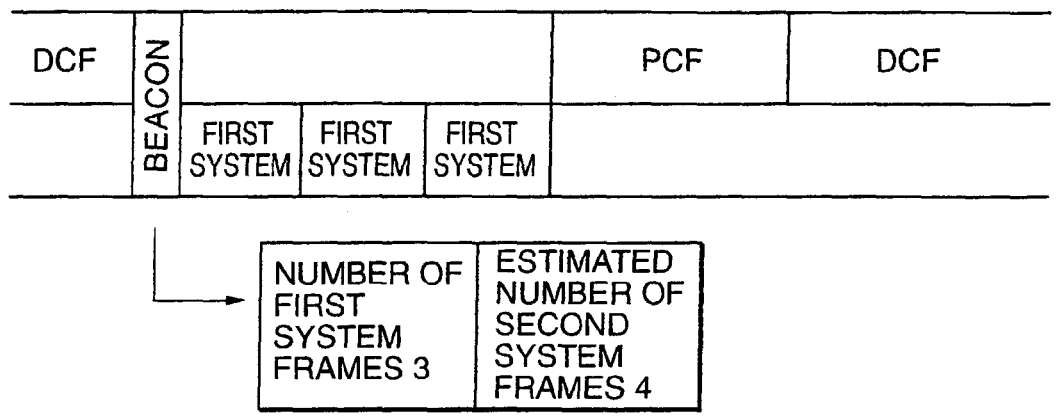
FIG. 8 is a diagram showing the second example of a format used in the wireless LAN system shown in FIG. 1.

Here, suppose a case where, as shown in FIG. 8, three consecutive frames in the first system, the PCF mode, and the DCF mode are arranged in this order. At this time, the AP/PC notifies the communication terminals, as 1information in the beacon, about the number of frames, three, in the first system, and the start time of the next frame in the first system (a period calculated on a frame basis). This information lets a communication terminal n-MT know that after completion of communication of the three frames, the transmission of the following frame is not started in its own system. This allows the communication terminal to switch its state to a standby state until the next frame is started.

It should be noted that complementary information on the continuous period or duration in the first system may also be notified instead of the above information.

Accordingly, frame duration and interval in the first system can be notified or posted to the communication terminals MT. Specifically, information on the number of consecutive frames in the first system, information on the duration, information on the interval during which the first system is out of action because another system is using the interval, and the like are notified.

Figure 9:
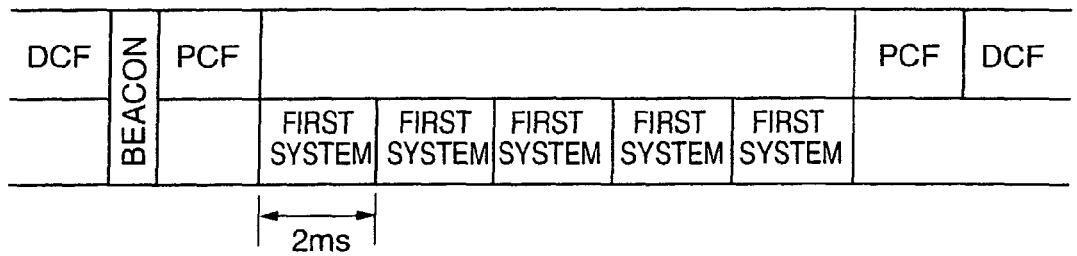
FIG. 9 is a diagram showing the third example of a format used in the wireless LAN system shown in FIG. 1.

Further, as shown in FIG. 9, a frame in the first system may be started at the time when a predetermined period of time (for example, a cycle of 2 ms) passes after completion of the DCF mode and transmission of a beacon, transmitting the following frames in synchronism with the frame cycle. At this time, if communication in the PDF mode is needed, frame transmission in the first system can be restarted after completion of communication in the PCF mode.

The communication in the first system can thus be performed in the protected period, and if frame transmission is started each time frame timing comes around within the period concerned, frame transmission can be conducted plural times.

Even if communication in the PCF mode is allocated between frames of the first system, frame transmission in the first system can be conducted again at the next frame timing.

Figure 10:
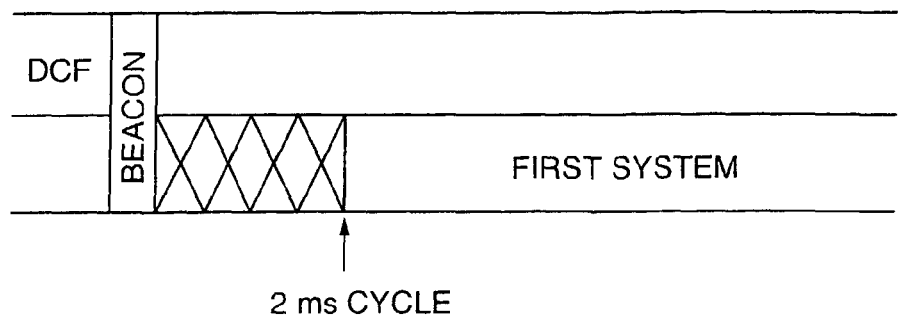
FIG. 10 is a diagram showing the fourth example of a format used in the wireless LAN system shown in FIG. 1.

Further, as shown in FIG. 10, communication of a variable-length packet may be performed during the interval from the transmission of a beacon after completion of the DCF mode until the next frame cycle, starting frame transmission in the first system when the frame cycle comes around. The variable-length packet has only to be used effectively until the frame cycle comes around, and if not needed, dummy data (cross-slash area in FIG. 10) may be transmitted for the time being.

The communication in the first system can thus be performed during the protected period while starting frame transmission in the first system periodically, that is, ensuring periodic transmission of BCH data. Especially, the provision of an upper limit to the DCF mode period can ensure this periodicity.

Figure 11:
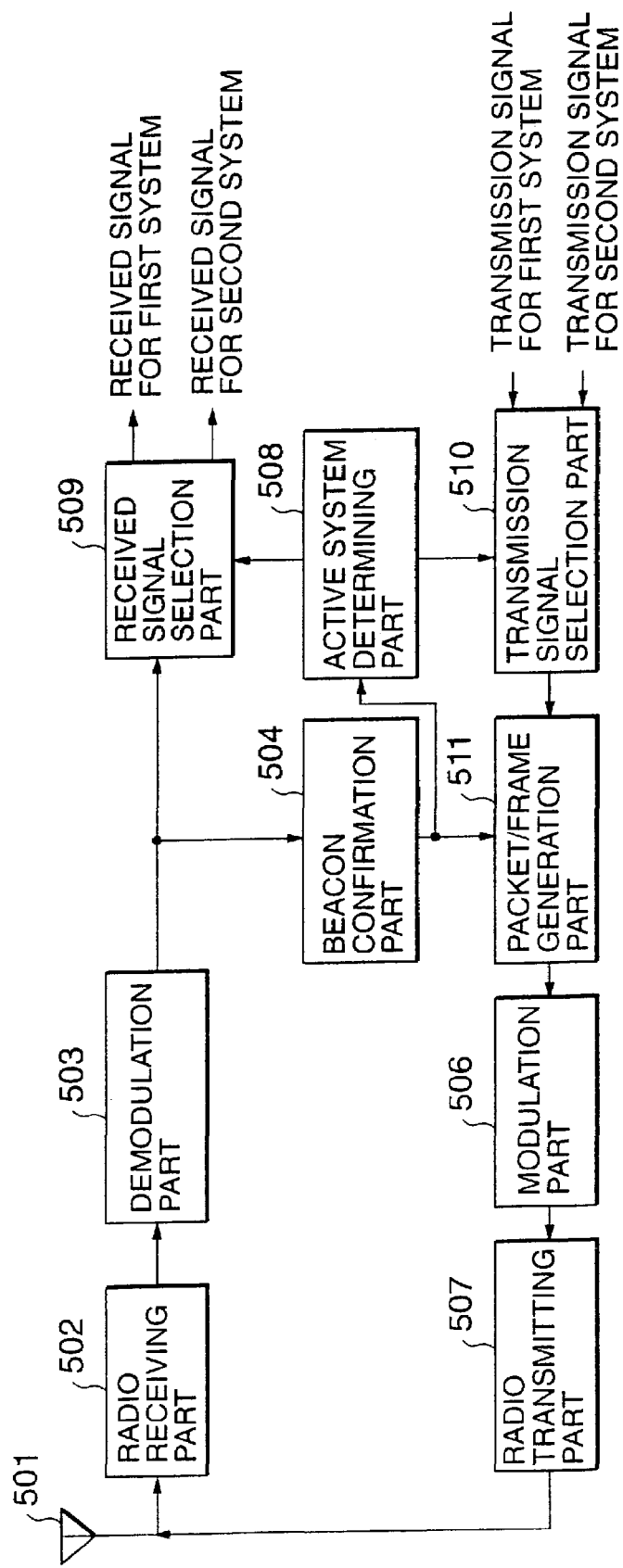
FIG. 11 is a diagram showing another configuration of a communication terminal used in the wireless LAN system shown in FIG. 1.

A configuration of a communication terminal n-MT that operates in the above manner will now be described. FIG. 11 is a diagram showing a configuration of a communication terminal used in the wireless LAN system shown in FIG. 1. In FIG. 11, the same parts as those in FIG. 5 are given the same reference numerals to omit their detailed descriptions.

The communication terminal n-MT includes an active system determining part 508 for determining an active system or system in operation based on an output (confirmation signal) from the beacon confirmation part 504, a received signal selection part 509 for selecting a received signal based on the result of determination by the active system determination part 508, and a transmission signal selection part 510 for selecting a transmission signal based on the result of determination by the active system determining part 508. Further, since signals are exchanged between two systems, the frame generation part 505 shown in FIG. 5 is replaced by a packet/frame generation part 511.

In the communication terminal n-MT shown in FIG. 11, the beacon confirmation part 504 confirms a beacon. When the beacon has been confirmed, the confirmation signal is outputted to the active system determining part 508. The active system determining part 508 obtains from the confirmation signal information indicative of the presence or absence of a frame in the first system or its period if any. This makes it possible to determine a period for which the communication terminal operates for the first system and a period for which the communication terminal operates for the second system.

When an active system is determined as a result of determination of each operating period, the determination result (active or inactive system information) is outputted to the received signal selection part 509 and the transmission signal selection part 510.

The received signal selection part 509 selects a received signal from a system that is operating based on the result of determination by the active system determining part 508, and outputs the selected one. In other words, when the first system is in operation, a received signal for the first system is outputted, while when the second system is in operation, a received signal for the second system is outputted.

The transmission signal selection part 510 selects a transmission signal from a system that is operating based on the result of determination by the active system determining part 508, and outputs the selected one to the packet/frame generation part 511. In other words, when the first system is in operation, a transmission signal for the first system is outputted to the packet/frame generation part 511, while when the second system is in operation, a transmission signal for the second system is outputted to the packet/frame generation part 511. The packet/frame generation part 511 generates a frame when being supplied with the transmission signal for the first system, while it generates a packet when being supplied with the transmission signal for the second system.

Switchover between the transmission signal and the received signal, and switchover in transmission packet/frame generation enable stable communication using communication resources for both systems. In the above description, a case where the active system is determined by the beacon including information on the first system is illustrated, but the present invention may be to determine the active system using a beacon including complementary information on the continuous period or duration in the second system.

Each communication terminal can thus know frame duration and interval in the first system and frame duration and interval in the second system. Further, the communication terminal can switch itself between the first and second systems to perform communication according to the period for which each system is operated. Accordingly, the communication terminal can automatically use plural system periods in response to switching of systems to perform communication, ensuring larger communication capacities. Further, since it is clear that communication is not performed during system periods other than that for the system concerned, the communication terminal can halt its transmission and reception functions mainly to realize power savings.

Figure 12:
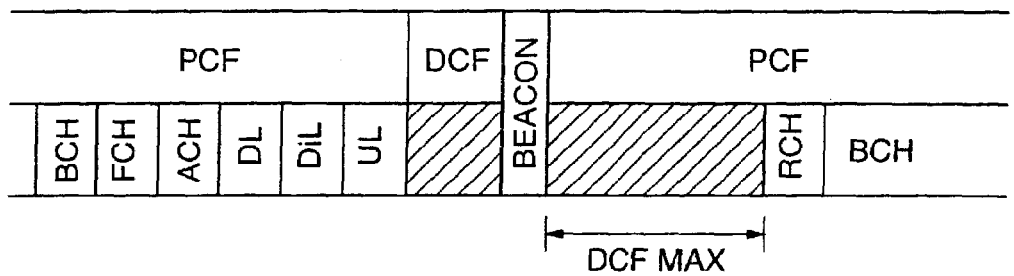
FIG. 12 is a diagram showing the fifth example of a format used in the wireless LAN system shown in FIG. 1.

Suppose that the communication terminal can support both systems as mentioned above. Suppose further that, as shown in FIG. 12, no communication terminal STA in the second system is not participating in communication. In this case, since no communication terminal operates in the PCF mode, there is a communication break in the PCF mode period after the frame of the first system.

However, since characteristics inherent in the access technique disable the system from knowing such a state that there is no communication during the DCF mode period, a period for initiating DCF mode access and a period corresponding to the maximum prescribed time (DCFmax) for a frame in the DCF mode must be reserved at all times.

With this being the situation, communication is performed in the normal form of the first system until a communication terminal STA in the second system initiates communication, and after it is detected that the communication terminal STA has initiated communication, switchover to the form of the wireless communication system of the present invention is made. It can avoid unused DCF mode periods and hence enable effective use of communication resources.

Thus, the communication resources for the second system are not spent during the period for which no communication terminal STA in the second system is involved in communication, enabling effective use of communication resources.

Figure 13:
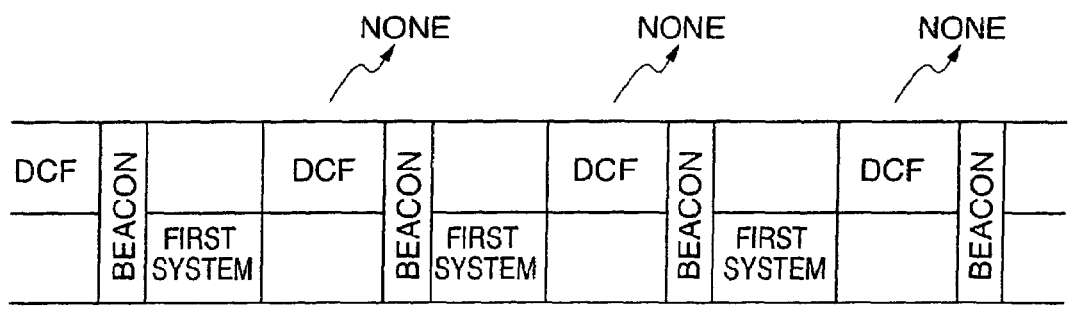
FIG. 13 is a diagram showing the sixth example of a format used in the wireless LAN system shown in FIG. 1.

Further, as shown in FIG. 13, if the communication terminal STA in the second system stops participating in the communication, no transmission request will be made in the PCF mode period. In this case, it can be known that no communication takes place in the PCF mode period, but it does not necessarily means that no communication terminal exists in the DCF mode.

Therefore, when it is known that all the communication terminals SAT in the second system have left the network, or when communication has not taken place in the DCF mode period for a predetermined period of time, the form of the wireless communication system of the present invention is switched to the normal form of the first system. It can omit the unused DCF mode period, and hence enable effective use of communication resources.

As a result, the communication resources for the second system are not spent during the period for which no communication terminal STA in the second system is involved in communication, enabling effective use of communication resources.

The operation of communication in the wireless LAN system having the above configuration will be described below.

Figure 14:
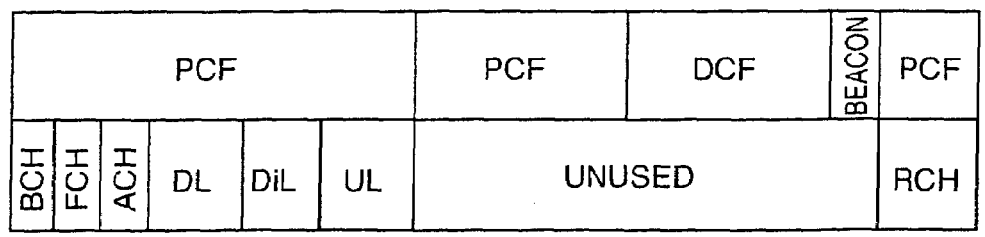
FIG. 14 is a diagram showing the seventh example of a format used in the wireless LAN system shown in FIG. 1.

FIG. 14 is a diagram showing a format used in the wireless LAN system shown in FIG. 14. The format shown in FIG. 14 is represented as length per unit time, for example, a length of 2 ms.

In the first system, periods of transmitting and receiving a downlink (DL) signal, a direct-link (DiL) signal, and an uplink (UL) signal are set after an RCH period and transmission and reception periods through control channels, namely BCH (Broadcast CHannel), FCH, and ACH. In the second system, the transmission and reception period in the PCF mode is set just after the beacon, and the transmission and reception period in the DCF mode is set after that. It should be noted that in the first system the period after the PCF mode of the second system is set as an unused period, and an RCH receiving period is so set that it starts at the time when the PCF mode of the second system starts.

In FIG. 14, a period corresponding to the communication period in the first system (from RCH to UL) corresponds to the PCF mode in the second system. It can avoid communication collisions with the first system. Further, the PCF mode period of the second system originally corresponds to an unused period in the first system. It enables communication in the second system while protecting frames in the second system from causing collisions.

Figure 15:
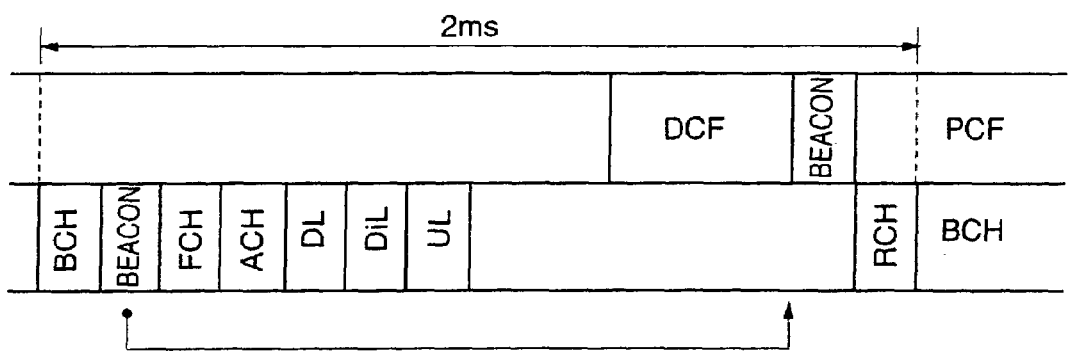
FIG. 15 is a diagram showing the eighth example of a format used in the wireless LAN system shown in FIG. 1.

Further, as shown in FIG. 15, a beacon for the first system may be transmitted after the BCH. In this case, the beacon is not used commonly as the beacon for the first system. Since the BCH has a fixed data length, the position of the beacon is made correspondent with the fixed cycle of the BCH (for example, a cycle of 2 ms).

This beacon indicates the period during which the beacon in the second system appears (or is estimated to appear) to enable the communication terminal n-MT to capture the beacon in the second system efficiently and hence know the start time of RCH' plus RCH to be described later.

When there is not this beacon, since the DCF mode takes in a variable-length frame, the finish position becomes indeterminate to force the communication terminal n-MT to track the second system beacon at all times. On the other hand, when the beacon is inserted after the BCH, since the information (beacon) to be transmitted in a fixed position indicates a minimum tracking period, the size and power consumption of the implement relating to this tracking can be reduced. Specifically, a signal synchronous capturing circuit has only to be operated for a minimum period of time.

This allows the communication terminal STA in the second system to receive identification signal information at the fixed timing just after the transmission of the BCH the cycle of which is known, and hence simplify its device structure compared to such a case that the identification signal is transmitted after a channel following the BCH and varying in timing.

Figure 16:
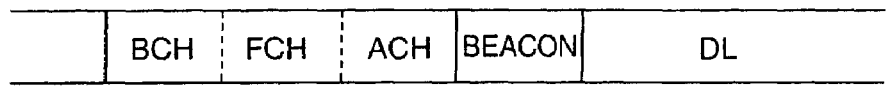
FIG. 16 is a diagram showing the ninth example of a format used in the wireless LAN system shown in FIG. 1.

The BCH, FCH, and ACH are channels to transmit a series of control information, and any conventional communication terminal MT may receive these pieces of information as a series. Therefore, as shown in FIG. 16, the beacon for the first system may be transmitted after completion of the BCH, FCH, and ACH.

After completion of the control channels, the beacon for the first system is thus transmitted into an area to which user data is to be transmitted. Since all data but data to its own terminal are received but scraped during the user data period, any conventional communication terminal can be prevented from malfunctioning due to confusion with the control channels.

The FCH and ACH are variable-length data, and respective pieces of information described in the BCH and FCH reveal the position of the beacon. The ability to obtain the respective pieces of information described in the BCH and FCH is provided in the conventional first system. Therefore, any new device does not need adding, and nothing causes the conventional communication terminal MT to malfunction.

Thus, the communication terminal MT in the first system can receive identification signal information at the timing just after the BCH with a known cycle and a broadcast phase the period of which is designated in the BCH. Further, since any of conventionally used communication terminals MT never receives user data other than data to its own terminal, the conventionally used communication terminal and the communication terminal n-MT according to the present invention can be mixedly used.

The beacon can thus be confirmed at the fixed timing just after the BCH or at the timing just after the broadcast phase the period of which is designated. In other words, the communication terminal n-MT has only to receive the beacon according to the frame timing without the need to search for the beacon throughout the entire frame period, which makes it possible to simplify the structure of the communication terminal n-MT.

Next, a description will be made about a case where the AP/PC as the communication accommodation device of the present invention communicates with a normal MT.

The MT receives a BCH signal from the AP/PC to confirm the start positions of the FCH, ACH, and RCH. In this case, although the AP/PC transmits a beacon, since the MT does not have a beacon confirmation part, it cannot confirm the beacon. However, since the conventional MT can work normally based on conventional annunciation information and is independent of all but specified data to be sent or received, the beacon never affect the MT.

The MT makes a call connection request in the RCH period to establish a call connection. Upon receipt of the connection request in the RCH period, the AP/PC controls the call connection by means of the connection control part 204. Then the AP/PC transmits the result to the connection request to the MT through the ACH.

The MT performs normal communication operation based on the result to the connection request transmitted through the ACH. Specifically, when the connection request has been honored, the MT sends and receives data to and from the AP/PC, while when not honored, the MT repeatedly sends a connection request in the RCH period.

Upon receipt of a transmission request, the AP/PC performs scheduling by means of the first scheduling part 205, and transmits the scheduling information to the MT through the FCH. The MT on one hand transmits an uplink signal in the UL period shown in FIG. 14 according to the scheduling information transmitted through the FCH, and on the other hand, receives a downlink signal from the AP/PC in the DL period shown in FIG. 14 according to the scheduling information transmitted through the FCH.

Thus the MT can perform normal communication in the high-performance wireless LAN through normal operation.

Next, a description will be made about a case where normal MT and n-STA communicate with each other through the AP/PC as the communication terminal accommodation device of the present invention.

When the MT transmits data to the AP/PC as an uplink signal, the AP/PC uses the data format conversion part 211 to convert the data into a data format for the second system (IEEE802.11 system). Then it bridges the converted data to the PC side features.

The AP/PC uses the mode decision part 212 to decide whether to select the PCF mode or the DCF mode, and transmits data in the decided mode to the targeted n-STA as a downlink signal.

On the other hand, the n-STA uses the beacon confirmation part 504 to confirm a beacon transmitted from the AP/PC. This makes it possible to recognize in which period and mode communication should be performed. Since the AP/PC has the PC features, it can control both the PCF mode and the DCF mode.

When the n-STA transmits data in a transmittable period (PCF period or DCF period) to the AP/PC as an uplink signal, the AP/PC uses the data format conversion part 211 to convert the data into a data format for the first system (high-performance wireless LAN system), and bridges the converted data to the AP side features. After sending and receiving control signals using the aforementioned control channels such as BCH and FCH, the AP/PC transmits data to the targeted MT as a downlink signal.

The use of an identification beacon to enable communication between two systems (the high-performance wireless LAN system and the IEEE802.11 system) makes it possible to perform communication between the MT under the control of the high-performance wireless LAN system and the n-STA under the control of the IEEE802.11 system.

In the second system, a beacon as the identification signal is inserted in the PCF mode period not to affect the PCF mode period even when a frame longer than the DCF mode period is transmitted. This beacon can be used commonly for the aforementioned beacon between two systems, thereby preventing the DCF frame from extending in the DCF mode period of the second system.

Such a beacon as to start the FCH can be inserted to prevent a frame extension in the DCF mode period, ensuring an RCH' period even in the second embodiment described below.

SECOND EMBODIMENT

In this embodiment, the MT is also given a beacon identification capability. Here, a description will be made about a case where when the transmission period of the DCF mode on the IEEE802.11 side is short, the remaining period is used effectively.

Figure 17:
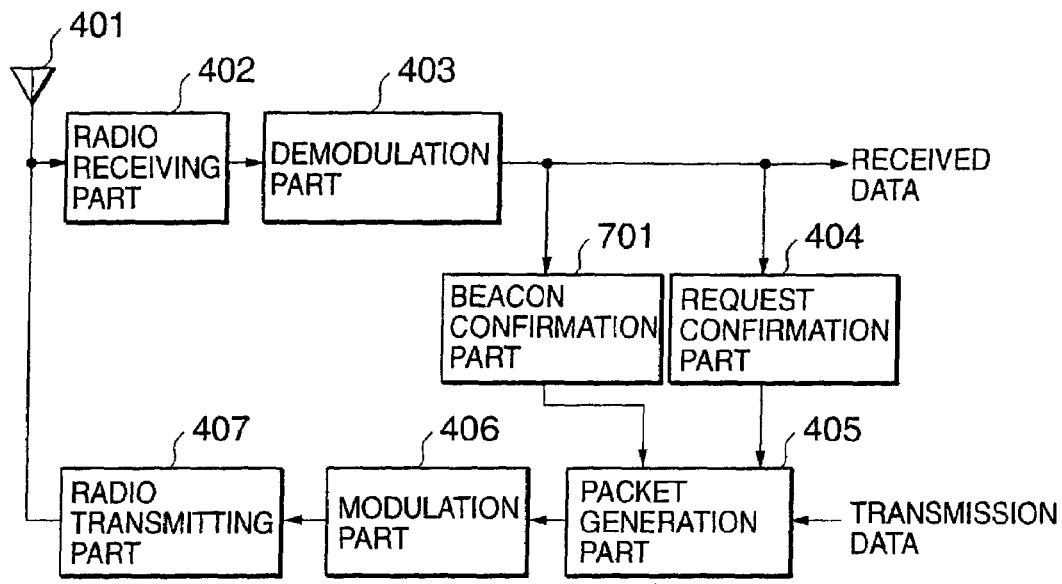
FIG. 17 is a diagram showing a configuration of a communication terminal device in the first system used in a wireless LAN system according to the second embodiment of the present invention.

FIG. 17 is a diagram showing a configuration of a communication terminal in the first system used in a wireless LAN system according to the second embodiment of the present invention. In FIG. 17, the same parts as those in FIG. 4 are given the same reference numerals to omit their detailed descriptions.

The communication terminal shown in FIG. 17 includes a beacon confirmation part 701 for confirming a beacon contained in a signal transmitted from the AP/PC. The use of the beacon enables effective use of an additional RCH period (RCH' period) caused when the DCF mode is short and a remaining period occurs. That is, a connection request can be made in the period to increase opportunities of making connection requests. If priorities are given to the connection requests made in this period, communication can be established to a specific communication terminal on a priority basis.

The operation of communication in the wireless LAN system having the above configuration will be described below.

Figure 18:
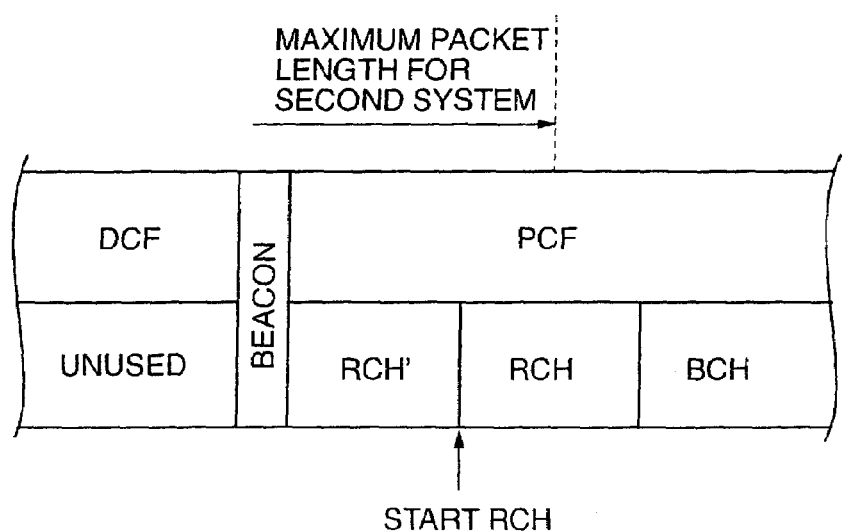
FIG. 18 is a diagram showing an example of a format used in the wireless LAN system according to the second embodiment of the present invention.
Figure 19:
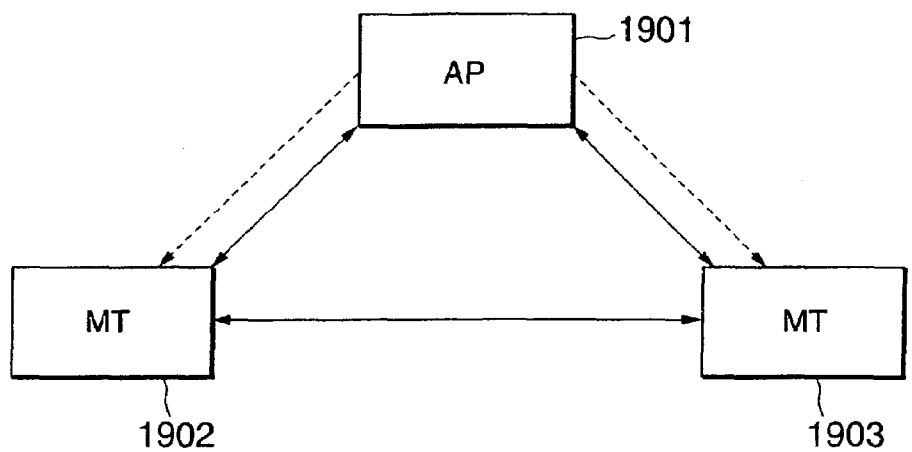
FIG. 19 is a diagram showing a configuration of a master-slave network in a conventional wireless LAN system.
Figure 20A:
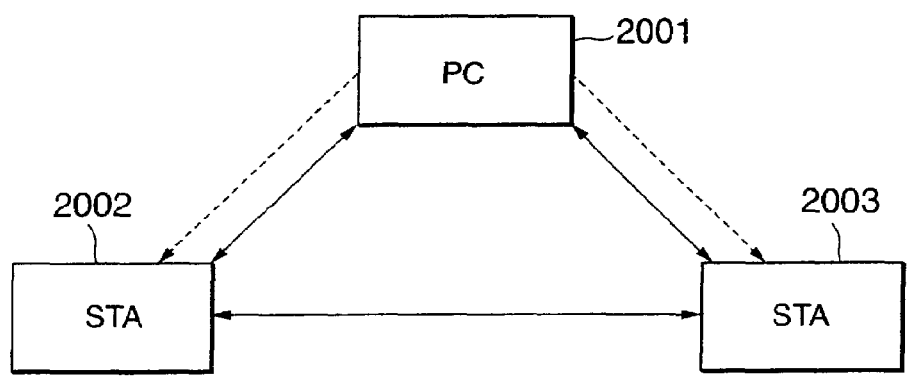
FIG. 20A is a diagram showing a configuration of a centralized control type direct connection network in a conventional wireless LAN system.
Figure 20B:
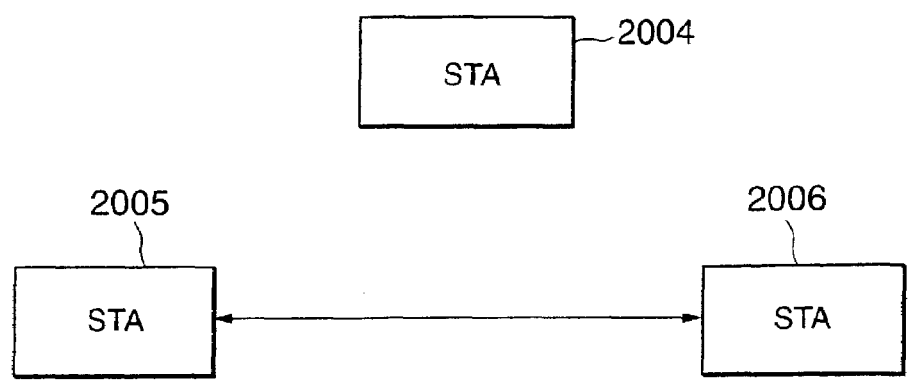
FIG. 20B is a diagram showing a configuration of a distributed control type direct connection network in a conventional wireless LAN system.

FIG. 18 is a diagram showing a format used in the wireless LAN system according to this embodiment. FIG. 18 is an enlarged view of the neighborhood of the beacon in the format shown in FIG. 14. In this format, the RCH' period usable by only n-MTs provided with the beacon confirmation part is set just after the beacon.

When the DCF mode is short, the RCH' period is set behind the beacon, inserted just after completion of the DCF mode period, up to the maximum packet length for the second system.

The n-MT provided with the beacon confirmation part according to this embodiment can confirm the beacon, that is, it can recognized the RCH' period, whereas any normal MT cannot confirm the beacon, and hence cannot recognize the RCH' period. For this reason, the n-MT can make a connection request in the RCH' period in addition to the RCH period, and the normal MT makes a connection request in the RCH period alone. As a result, the n-MT can make a connection request to the AP/PC more effectively than the normal MT.

A description will first be made about a case where the AP/PC as the communication terminal accommodation device of the present invention communicates with the n-MT.

The n-MT receives a BCH signal posted from the AP/PC to confirm the starting positions of the FCH, ACH, and RCH periods. In this case, since the n-MT is provided with the beacon confirmation part 504, it can recognize the beacon. For this reason, the n-MT can recognize the starting position of the RCH' period.

The n-MT makes a connection request in the RCH and RCH' periods to establish a call connection. Upon receipt of the connection request in the RCH and RCH' periods, the AP/PC controls the call connection by means of the connection control part 204. Then the AP/PC transmits the result to the connection request to the MT through the ACH.

The n-MT performs normal communication operation based on the result to the connection request transmitted through the ACH. Specifically, when the connection request has been honored, the n-MT sends and receives data to and from the AP/PC, while when not honored, the n-MT repeatedly sends a connection request in the RCH' period and the RCH period.

Upon receipt of a transmission request, the AP/PC performs scheduling by means of the first scheduling part 205, and transmits the scheduling information to the MT through the FCH. The MT on one hand transmits an uplink signal in the UL period shown in FIG. 14 according to the scheduling information transmitted through the FCH, and on the other hand, receives a downlink signal from the AP/PC in the DL period shown in FIG. 14 according to the scheduling information transmitted through the FCH.

The n-MT can thus work to perform communication in the high-performance wireless LAN. Further, the n-MT can make a connection request in the RCH' period, which can be effective in establishing a call connection.

Next, a description will be made about a case where normal AP and n-MT communicate with each other.

When the n-MT receives a BCH signal posted from the AP to confirm the starting positions of the FCH, ACH, and RCH periods. In this case, since the AP does not transmit any beacon, the n-MT makes a connection request in the RCH period alone.

Upon receipt of the connection request, the AP controls the call connection by means of the connection control part 204. Then the AP transmits the result to the connection request to the MT through the ACH.

The n-MT performs normal communication operation based on the result to the connection request transmitted through the ACH. Specifically, when the connection request has been honored, the n-MT sends and receives data to and from the AP, while when not honored, the n-MT repeatedly sends a connection request in the RCH period.

Upon receipt of a transmission request, the AP performs scheduling by means of the first scheduling part 205, and transmits the scheduling information to the n-MT through the FCH. The MT on one hand transmits an uplink signal in the UL period shown in FIG. 14 according to the scheduling information transmitted through the FCH, and on the other hand, receives a downlink signal from the AP in the DL period shown in FIG. 14 according to the scheduling information transmitted through the FCH.

Thus, communication even with the normal AP can be performed in the high-performance wireless LAN.

Next, a description will be made about a case where n-MT and normal STA communicate with each other through the AP/PC as the communication terminal accommodation device of the present invention. When the n-MT transmits data to the AP/PC as an uplink signal, the AP/PC uses the data format conversion part 211 to convert the data into a data format for the second system (IEEE802.11 system). Then it bridges the converted data to the PC side features.

The AP/PC uses the mode decision part 212 to decide whether to select the PCF mode or the DCF mode, and transmits data in the decided mode to the targeted STA as a downlink signal.

On the other hand, the STA uses the beacon confirmation part 504 to confirm a beacon transmitted from the AP/PC. This makes it possible to recognize in which period communication should be performed. Since the AP/PC has the PC features, it can control both the PCF mode and the DCF mode.

When the STA transmits data in a transmittable period (PCF period or DCF period) to the AP/PC as an uplink signal, the AP/PC uses the data format conversion part 211 to convert the data into a data format for the first system (high-performance wireless LAN system), and bridges the converted data to the AP side features. Then the STA transmits data to the targeted n-MT as a downlink signal in the manner mentioned above.

The use of an identification beacon to enable communication between two systems (the high-performance wireless LAN system and the IEEE802.11 system) makes it possible to perform communication between the n-MT under the control of the high-performance wireless LAN system and the STA under the control of the IEEE802.11 system.

In the aforementioned first and second embodiments, communication between PC and STA, communication between STAs, communication between MTs, communication between MT and n-MT, communication between n-MTs, and communication between AP and MT are in line with the specifications, and their descriptions will be omitted.

The present invention is not limited to the aforementioned first and second embodiments, and various changes are possible. For example, although the first and second embodiments describe a case where a beacon is inserted before the RCH period of the first system, if the beacon can function as an identification signal for a case where the high-performance wireless LAN system and the IEEE802.11 system are merged, the beacon may be inserted between ACH and DL, DL and DiL, DiL and UL, UL and the RCH period, and the RCH period and BCH in the first system.

INDUSTRIAL APPLICABILITY

As described above and according to the present invention, the communication terminal accommodation device inserts into a transmission signal an identification signal, which can be identified by at least communication terminals under the control of the IEEE802.11 system, to enable communication between communication terminals under the control of different systems, such as the high-performance wireless LAN system and the IEEE802.11 system, without interference with each other.

The invention claimed is:

1. A communication terminal accommodation device comprising:
   first communication control means for performing communication in a masterslave network;
   second communication control means for performing communication in a direct connection network; and
   identification signal inserting means for inserting an identification signal into a transmission signal to monitor each control mode period, wherein:
   the identification signal is commonly used to identify both centralized control and distributed control modes in the direct connection network.

2. A communication terminal accommodation device comprising:
   first communication control means for performing communication in a master-slave network;
   second communication control means for performing communication in a direct connection network; and
   identification signal inserting means for inserting an identification signal into a transmission signal to monitor each control mode period, wherein:
   an upper limit to the period of a distributed control mode is provided within a range not exceeding the length of a transmission unit for communication in the direct connection network.

3. A communication terminal accommodation device comprising:
   first communication control means for performing communication in a master-slave network;
   second communication control means for performing communication in a direct connection network; and
   identification signal inserting means for inserting an identification signal into a transmission signal to monitor each control mode period, wherein:
   said identification signal inserting means inserts the identification signal just after completion of the period of a distributed control mode, and
   communication in a centralized control mode is initiated immediately following the identification signal just after completion of the period of the distributed control mode, and the transmission of a frame of the master-slave network is initiated at the frame timing in the master-slave network.

4. A communication terminal accommodation device comprising:
   first communication control means for performing communication in a masterslave network;
   second communication control means for performing communication in a direct connection network; and
   identification signal inserting means for inserting an identification signal into a transmission signal to monitor each control mode period, wherein:
   said identification signal inserting means inserts the identification signal just after completion of the period of a distributed control mode, and
   the communication period of a variable-length packet in the master-slave network is provided immediately following the identification signal just after completion of the period of the distributed control mode so that frame transmission of the master-slave network will be initiated at the frame timing in the masterslave network.

5. The communication terminal accommodation device according to claim 4 wherein priority is given to a connection request in a connection request period immediately following the identification signal just after completion of the period of the distributed control mode.

6. A communication terminal accommodation device comprising:
   first communication control means for performing communication in a master-slave network;
   second communication control means for performing communication in a direct connection network;
   identification signal inserting means for inserting an identification signal into a transmission signal to monitor each control mode period; and
   monitoring means for monitoring traffic conditions in the communication, and communication period calculating means for calculating communication periods in the master-slave network and the direct connection network based on the traffic conditions.

7. The communication terminal accommodation device according to claim 6 wherein said communication period calculating means further includes first required-band calculating means for calculating a required band from a communication request in the master-slave network monitored by said monitoring means, second required-band calculating means for calculating a required band from a communication request in a centralized control mode of the direct connection network monitored by said monitoring means, and third required-band calculating means for calculating a required band from a usage or collision rate in the distributed control mode of the direct connection network monitored by said monitoring means, whereby the communication periods are calculated, based on the required bands calculated from said first to third required-band calculating means, so that communication in the master-slave network and communication in the direct connection network will be distributed impartially.

8. The communication terminal accommodation device according to claim 6 wherein said communication period calculating means calculates the communication period of a variable-length packet in the master-slave network immediately following the identification signal just after completion of the period of the distributed control mode, and calculates a mixed period based on the communication period, such that the transmission of a frame of the master-slave network is performed during the communication period at the frame timing in the master-slave network, while communication is performed during the mixed period in such a communication state that it is mixed with communication in the distributed control mode.

* * * * *